United States Patent
Hong et al.

(10) Patent No.: US 7,963,550 B2
(45) Date of Patent: Jun. 21, 2011

(54) KNEE AIRBAG AND METHOD OF FOLDING THE SAME

(75) Inventors: Ik-pyo Hong, Wonju-si (KR);
Gyeong-won Jeong, Seoul (KR)

(73) Assignee: Autoliv Development AB, Vargarda (SE)

( * ) Notice: Subject to any disclaimer, the term of this patent is extended or adjusted under 35 U.S.C. 154(b) by 250 days.

(21) Appl. No.: 12/062,437

(22) Filed: Apr. 3, 2008

(65) Prior Publication Data

US 2009/0152847 A1  Jun. 18, 2009

(30) Foreign Application Priority Data

Dec. 18, 2007  (KR) .......................... 10-2007-0133520
Dec. 18, 2007  (KR) .......................... 10-2007-0133527

(51) Int. Cl.
*B60R 21/16* (2006.01)
(52) U.S. Cl. .................. 280/730.1; 280/729; 280/743.1; 280/743.2
(58) Field of Classification Search .................. 280/729, 280/730.1, 733, 742, 743.1, 743.2
See application file for complete search history.

(56) References Cited

U.S. PATENT DOCUMENTS

| | | | | |
|---|---|---|---|---|
| 5,048,863 A | * | 9/1991 | Henseler et al. | 280/743.1 |
| 5,333,903 A | * | 8/1994 | Eyrainer et al. | 280/743.1 |
| 5,639,118 A | * | 6/1997 | Rhule et al. | 280/743.1 |
| 6,428,042 B1 | * | 8/2002 | Fischer et al. | 280/739 |
| 6,685,217 B2 | * | 2/2004 | Abe | 280/730.1 |
| 7,434,837 B2 | * | 10/2008 | Hotta et al. | 280/743.2 |
| 2003/0030255 A1 | * | 2/2003 | Igawa et al. | 280/730.1 |
| 2003/0193174 A1 | * | 10/2003 | Abe | 280/730.1 |
| 2005/0151351 A1 | * | 7/2005 | Enders et al. | 280/730.1 |
| 2006/0108780 A1 | * | 5/2006 | Hotta et al. | 280/732 |
| 2007/0200320 A1 | * | 8/2007 | Keshavaraj | 280/730.1 |

FOREIGN PATENT DOCUMENTS

| | | | |
|---|---|---|---|
| JP | 2003226218 A | * | 8/2003 |
| KR | 10-2003-0050611 A | | 6/2003 |
| KR | 10-2005-0093843 A | | 9/2005 |

OTHER PUBLICATIONS

Kazuhiro Abe, Vehicular Occupant Protection Device, Aug. 12, 2003, JPO, JP 2003-226218A, English Abstract.*
Kazuhiro Abe, Vehicular Occupant Protection Device, Aug. 12, 2003, JPO, JP 2003-226218A, Machine translation of Description.*

* cited by examiner

*Primary Examiner* — Toan C To
*Assistant Examiner* — James English
(74) *Attorney, Agent, or Firm* — Brinks Hofer Gilson & Lione

(57) ABSTRACT

Provided is a knee airbag capable of adjusting the height and width of the airbag upon deployment thereof and deploying the airbag along a lower crash panel. The knee airbag is installed at a lower crash panel and has an inflator installed at a predetermined position thereof, wherein the knee airbag has at least one wrinkle part folded in a longitudinal direction of side surfaces thereof. Since an upper part of the knee airbag is expanded more than a lower part thereof, it is possible to more safely protect passenger's knees. In addition, since the knee airbag is expanded upward and downward, it is also possible to protect passenger's ankles and readily adjust the height and width of the knee airbag. Further, the knee airbag is expanded to correspond to an appearance of a lower crash, thereby more safely protecting the passenger.

10 Claims, 18 Drawing Sheets

S2
FIG. 10
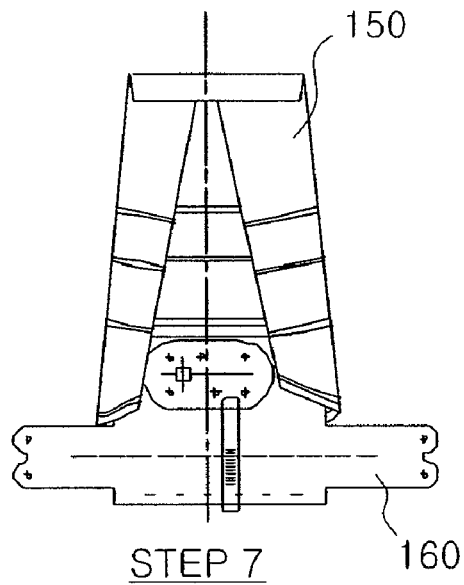
STEP 7
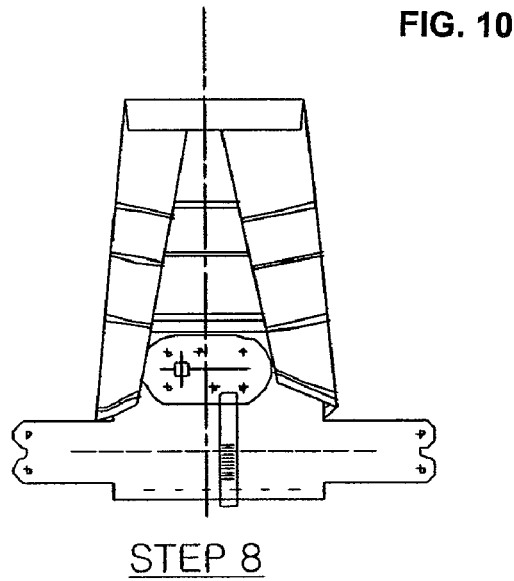
STEP 8
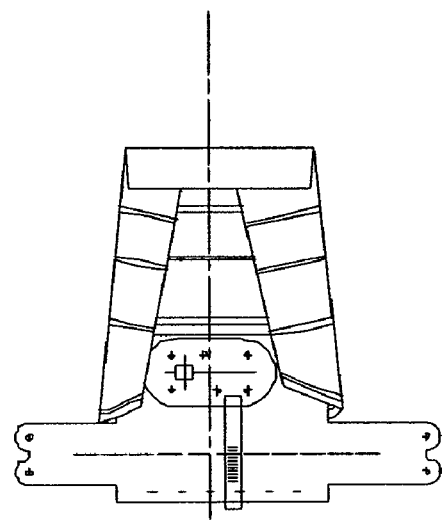
STEP 9
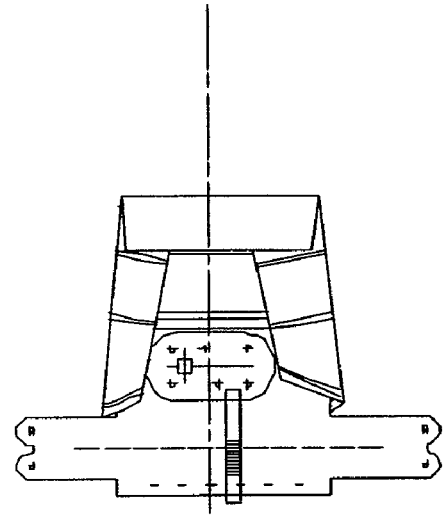
STEP 10
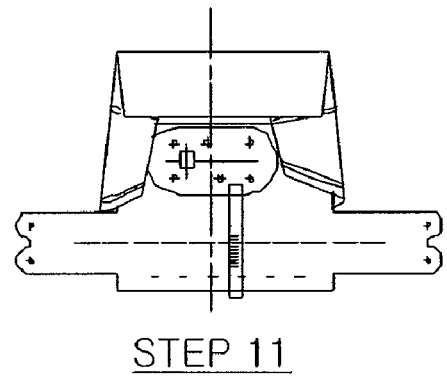
STEP 11

FIG. 11
S3
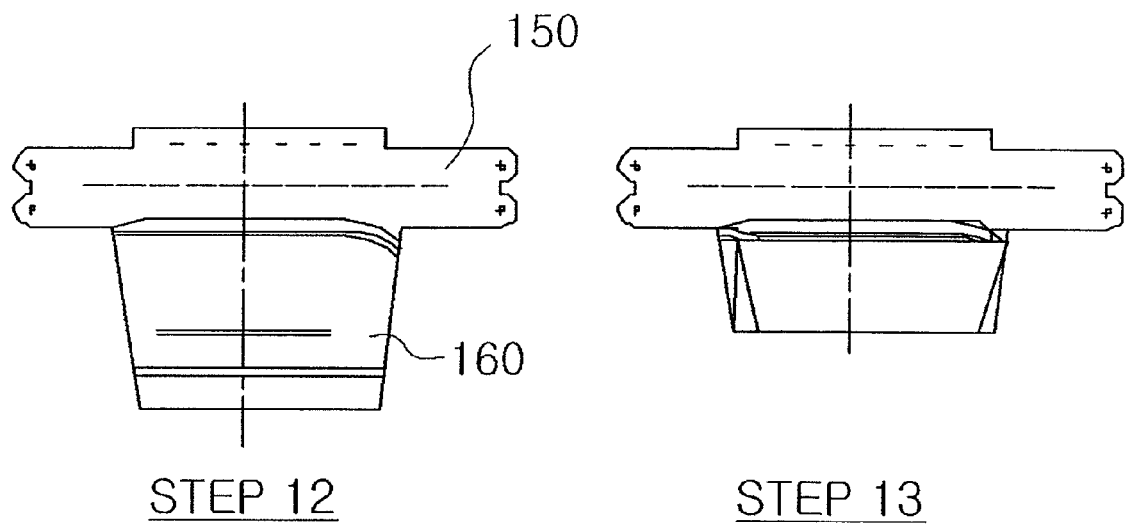
STEP 12        STEP 13
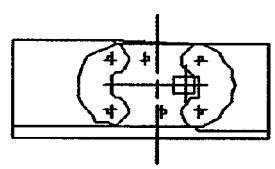
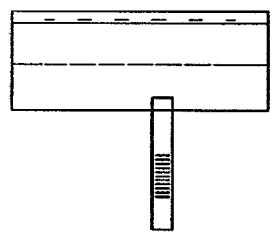
STEP 14

FIG. 14
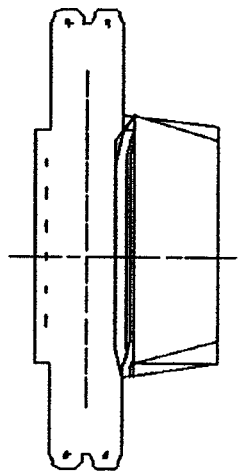
STEP 14
S30
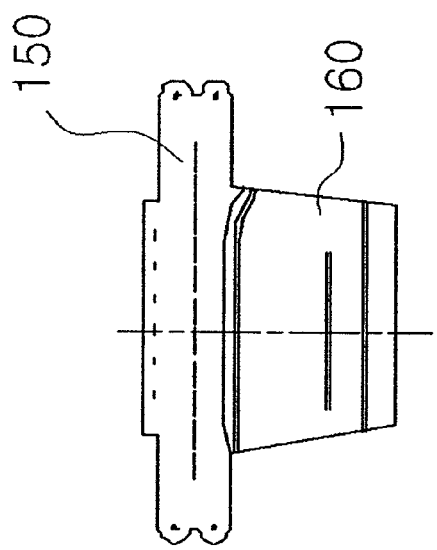
150
160
STEP 13
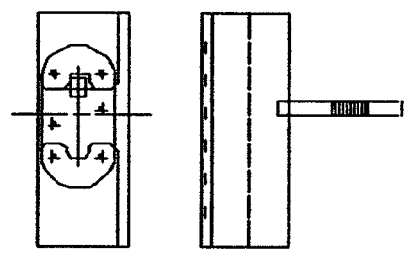
STEP 15

KNEE AIRBAG AND METHOD OF FOLDING THE SAME

CROSS-REFERENCE TO RELATED APPLICATIONS

This application claims the benefit of Korean Patent Application Nos. 2007-0133527, filed Dec. 18, 2007 and 2007-0133520, filed Dec. 18, 2007, the disclosure of which is hereby incorporated herein by reference in their entirety.

BACKGROUND OF THE INVENTION

1. Field of the Invention

The present invention relates to a knee airbag and a method of folding the same, and more particularly, to a knee airbag which is installed at a lower crash panel of a vehicle to protect driver's knees or passenger's knees and smoothly deployed without any interference with the lower crash panel during deployment of an airbag, and a method of folding the same.

2. Description of the Related Art

In general, various kinds of safety devices are installed at a vehicle to protect passengers from accidents occurring during running of the vehicle, for example, collision, rear-end collision, rollover, and so on. Such safety devices include a safety belt, an airbag, and so on, which absorbs shock even though the passengers may collide with a vehicle body upon occurrence of an accident.

The airbags are installed at a steering wheel in front of a driver's seat to protect a driver, and installed at an instrument panel in front of a passenger's seat to protect a passenger. In addition, side airbags or curtain airbags are installed to protect passengers on backseats.

In particular, a knee airbag for protecting driver's knees or passenger's knees is installed at a cowl bracket under a steering wheel or installed under an instrument panel.

An example of such a knee airbag is disclosed in Korean Patent Laid-open Publication No. 2003-50611 (hereinafter, referred to as "Conventional Art 1"), entitled "Air Bag System for Knee Protection of Driver," which is shown in FIGS. 1A to 1C.

As shown in FIGS. 1A to 1C, a knee airbag 10 of Conventional Art 1 includes an inflator unit 11 installed inside a lower crash pad 3 to be exploded according to control of an airbag control unit, and an airbag tube 12 deployed from the lower crash pad 3 to a shroud panel 2 by an expansion gas injected upon explosion of the inflator unit 11.

In addition, the knee airbag further includes an airbag cover 14 surrounding the airbag tube 12, fixed to the lower crash pad 3 through the medium of a plurality of fixing members 13, separated from the lower crash pad 3 upon deployment of the airbag tube 12, and avoiding any interference with the airbag tube 12 and peripheral components to prevent damage to the airbag tube 12, and an airbag fixing means 15 for connecting a tip of the airbag tube 12 disposed adjacent to the shroud panel 2 to a predetermined part of the shroud panel 2 and guiding a deployment direction such that the tip of the airbag tube 12 is deployed into the shroud panel 2 upon explosion of the inflator unit 11.

The airbag of Conventional Art 1 protects driver's knees through expansion of the airbag upon occurrence of a vehicle accident.

Further, another example of such a knee airbag is disclosed in Korean Patent Laid-open Publication No. 2005-93843 (hereinafter, referred to as "Conventional Art 2"), entitled "Knee Protection Apparatus for Vehicle Occupant," which is shown in FIGS. 2A to 2C.

As shown in FIGS. 2A to 2C, a knee airbag module 10' of Conventional Art 2 is fixed to an instrument panel reinforcement part 23 through a panel 21 and left/right brackets 22, and to a bottom part 24a of an instrument panel 24 through the panel 21.

The knee airbag 10' includes an airbag 11', an inflator 12' for supplying a gas into the airbag 11' upon a vehicle collision, an airbag case 13' accommodating the airbag 11' and the inflator 12', and an airbag cover 14' covering the airbag case 13'.

Furthermore, the airbag cover 14' is attached to the airbag case 13' and a panel 21 to cover a rear opening 13a of the airbag case 13' and an opening 21a of the panel 21, and a rectangular door part 14a is installed at a position corresponding to the rear opening 13a of the airbag case 13' and the opening 21a of the panel 21.

In addition, a relatively thin hinge part 14c is formed at a lower periphery of the door part 14a such that the door part 14a is opened downward upon expansion of the airbag 11'.

SUMMARY OF THE INVENTION

An aspect of the present invention is to provide a knee airbag capable of adjusting the height and width of the airbag upon deployment thereof and deploying the airbag along a lower crash panel.

Another aspect of the present invention is to provide a method of folding a knee airbag capable of preventing contact with an instrument panel upon deployment of the airbag to more rapidly and smoothly expand the airbag.

An aspect of the invention provides a knee airbag installed at a lower crash panel and having an inflator installed at a predetermined position thereof, wherein the knee airbag has at least one wrinkle part folded in a longitudinal direction of side surfaces thereof.

Another aspect of the invention provides a method of folding a knee airbag including a side surface roll-folding step of roll-folding side surfaces of the airbag, and a vertical roll-folding step of roll-folding the airbag from an upside to a downside after the side surface roll-folding step.

BRIEF DESCRIPTION OF THE DRAWINGS

The above and other aspects, features and advantages of the present invention will be more apparent from the following detailed description taken in conjunction with the accompanying drawings, in which:

FIG. 10 is a view showing a vertical roll-folding step in accordance with a fourth exemplary embodiment of the present invention;

FIG. 11 is a view showing a finishing step in accordance with a fourth exemplary embodiment of the present invention;

FIG. 14 is a view showing a finishing step in accordance with a fifth exemplary embodiment of the present invention.

DETAILED DESCRIPTION OF EMBODIMENTS

The knee airbag of Conventional Art 1 is deployed in the shroud panel, and driver or passenger knees may collide with the shroud panel and therefore shock absorption of the airbag may be decreased.

The knee airbag of Conventional Art 2 is rapidly expanded upon collision of vehicles, and a brush burn may occur due to friction between the driver's knee and the airbag, and vibrations may occur due to rapid injection of the expansion gas generated from the inflator to make it difficult to smoothly expand the airbag.

Further, a wide deployment width of the conventional airbag may cause a contact with the instrument panel to generate resistance, it is difficult to rapidly deploy and smoothly expand the airbag.

Embodiment 1

A knee airbag in accordance with the present invention has wrinkle parts folded to overlap each other in a longitudinal direction when seen from a side view in an expanded state thereof.

Hereinafter, exemplary embodiments of the present invention will be described with reference to the accompanying drawings.

Figure 1A:
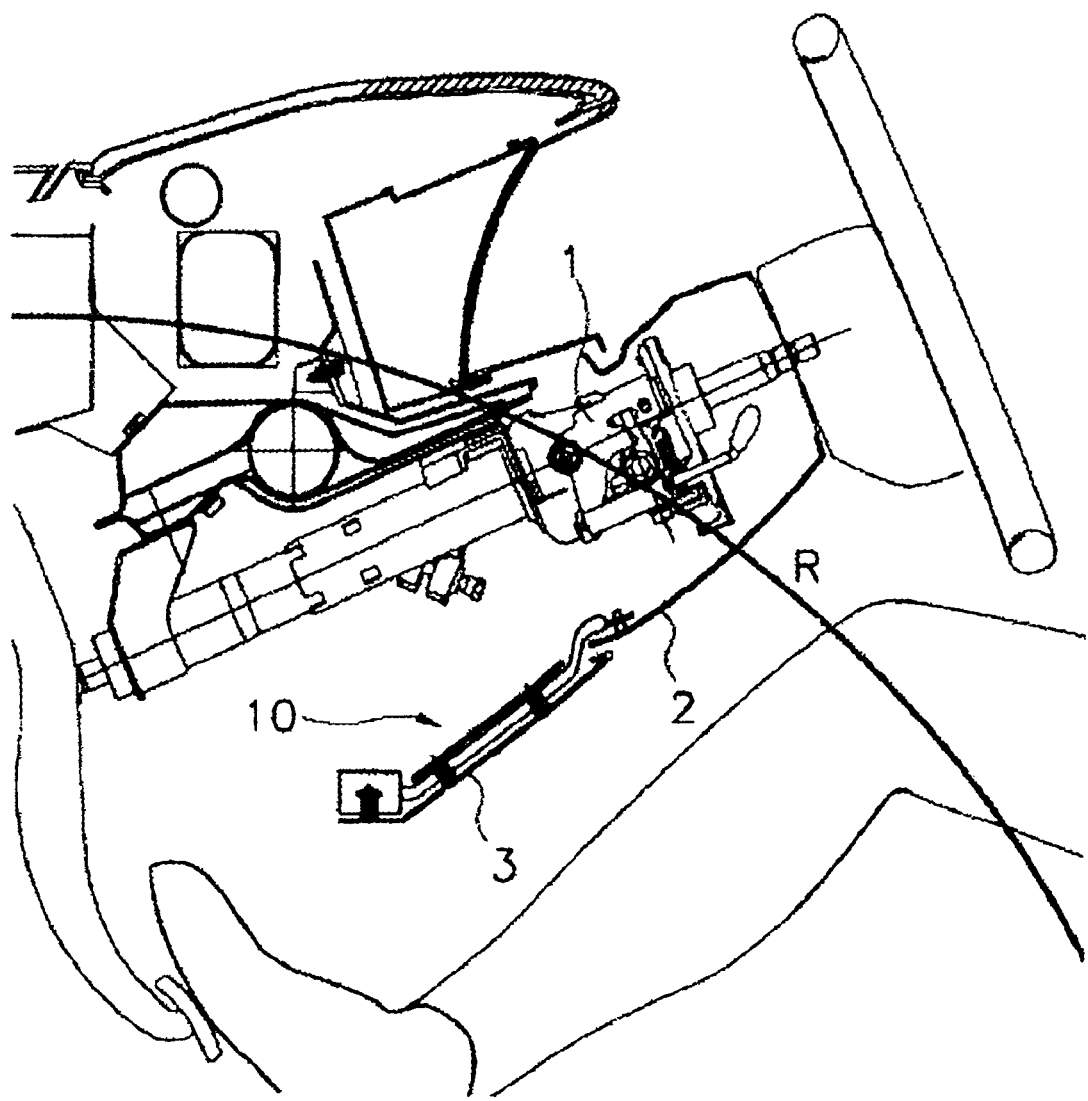
FIGS. 1A to 1C are cross-sectional views of a conventional knee airbag.
Figure 1B:
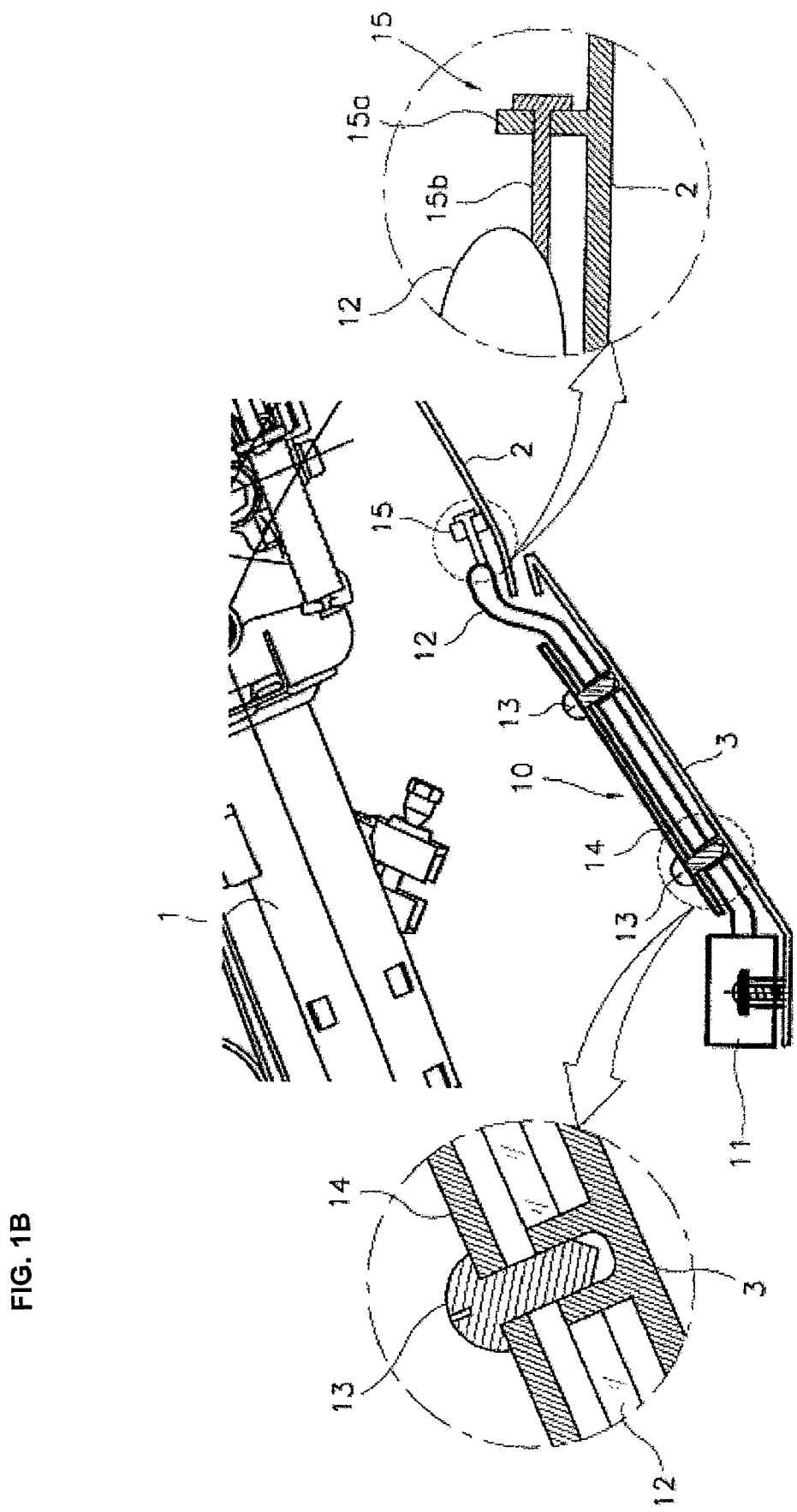
Figure 1C:
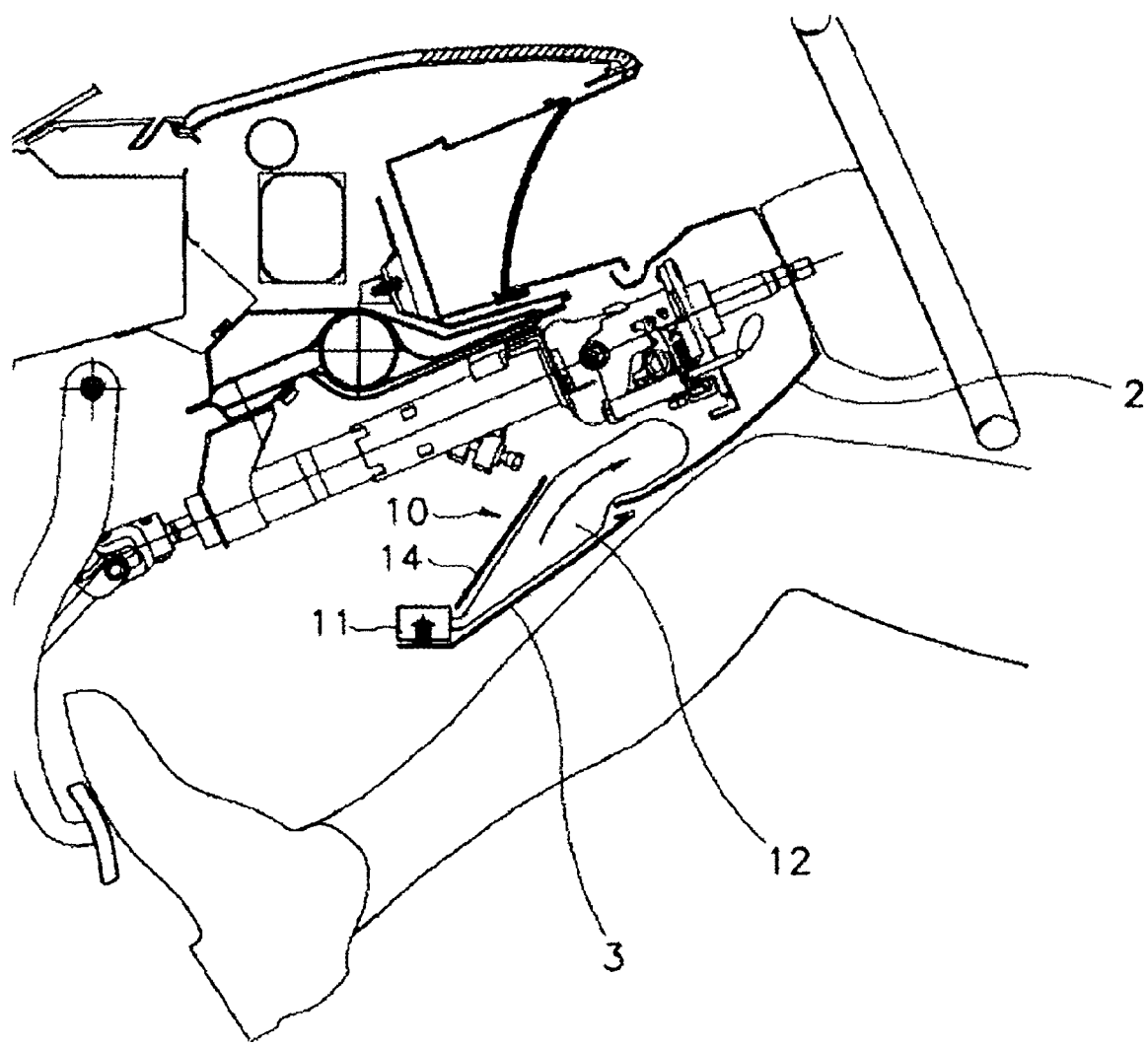
Figure 2A:
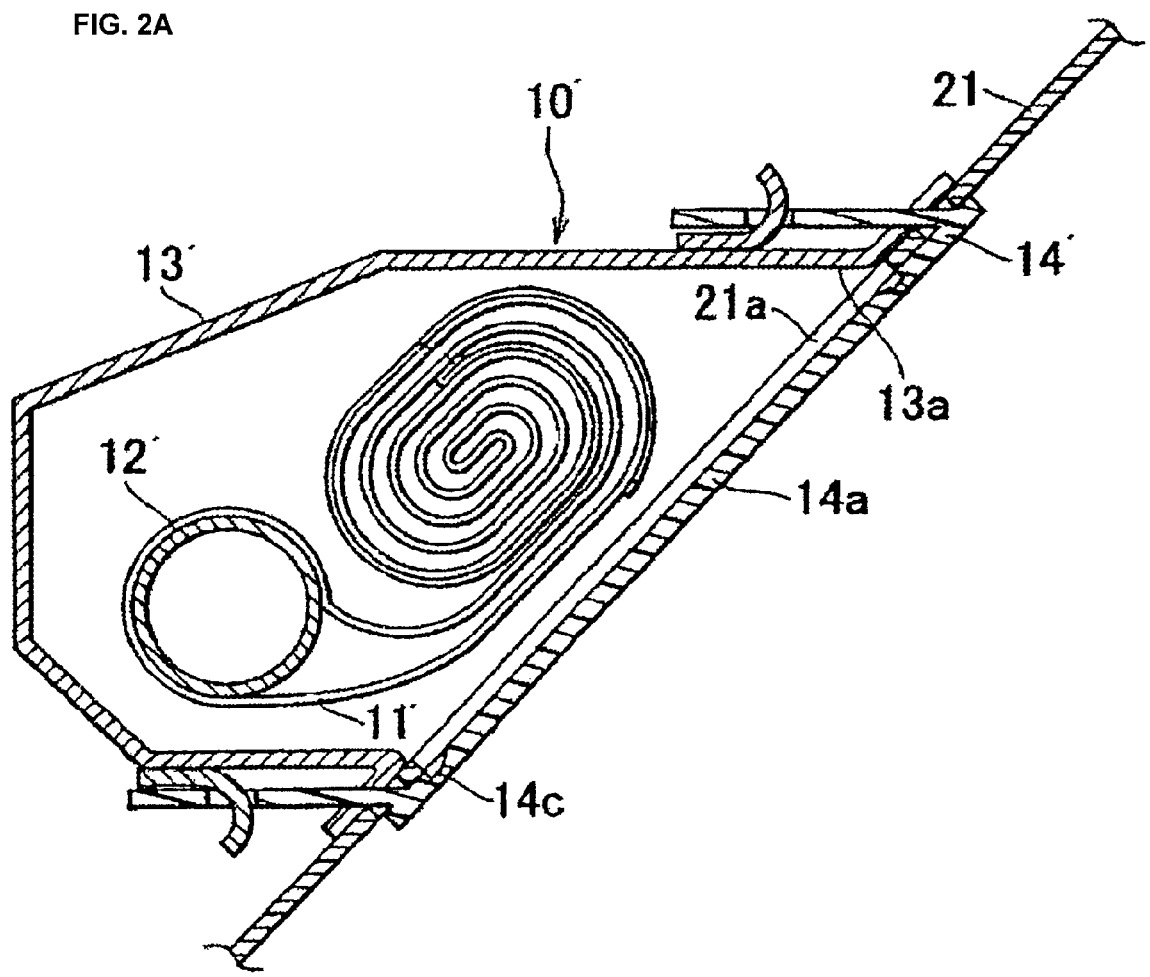
FIGS. 2A to 2C are cross-sectional views of a conventional knee airbag for a passenger.
Figure 2B:
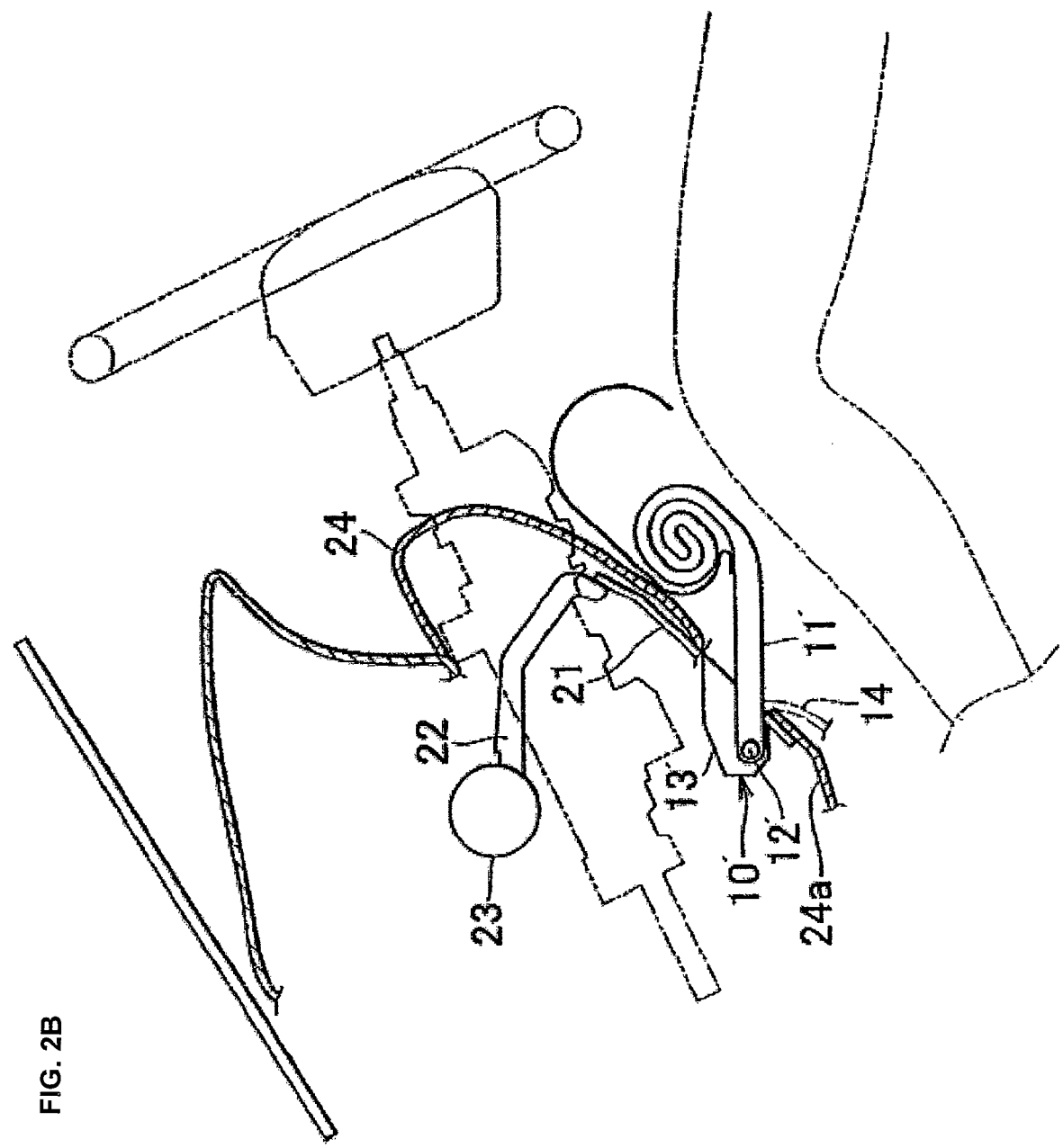
Figure 2C:
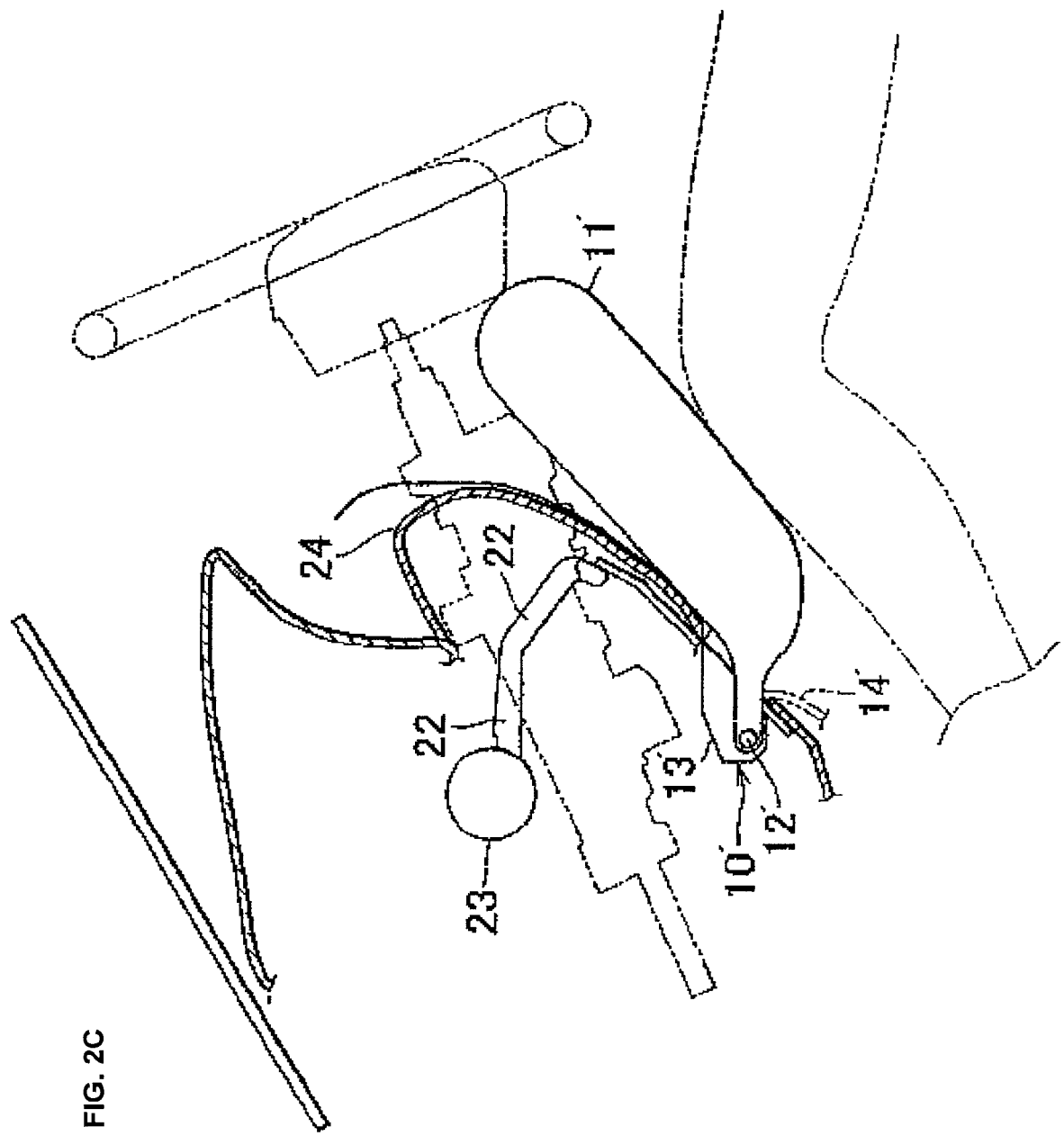
Figure 3:
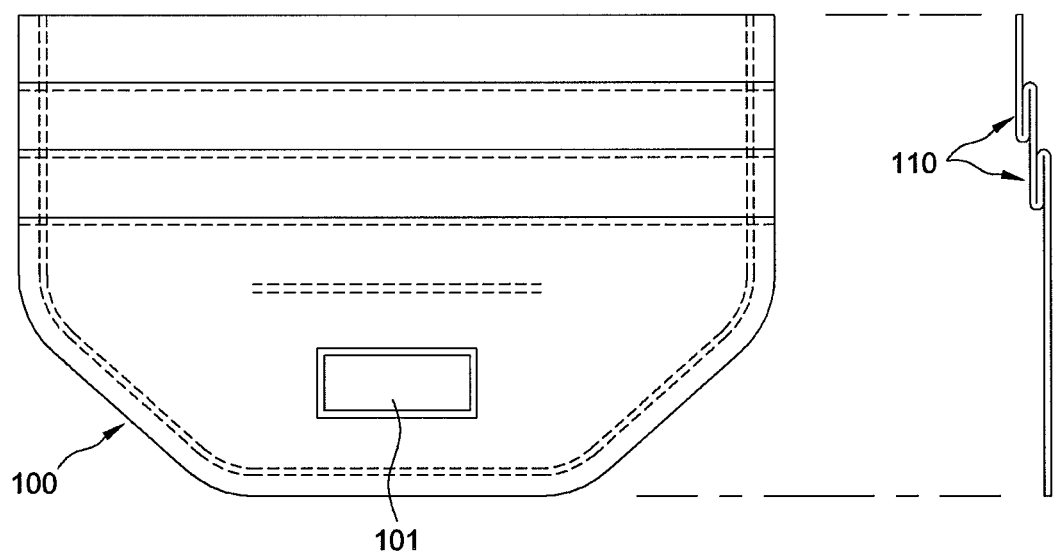
FIG. 3 is a front view and a side view of a knee airbag in accordance with a first exemplary embodiment of the present invention.
Figure 4:
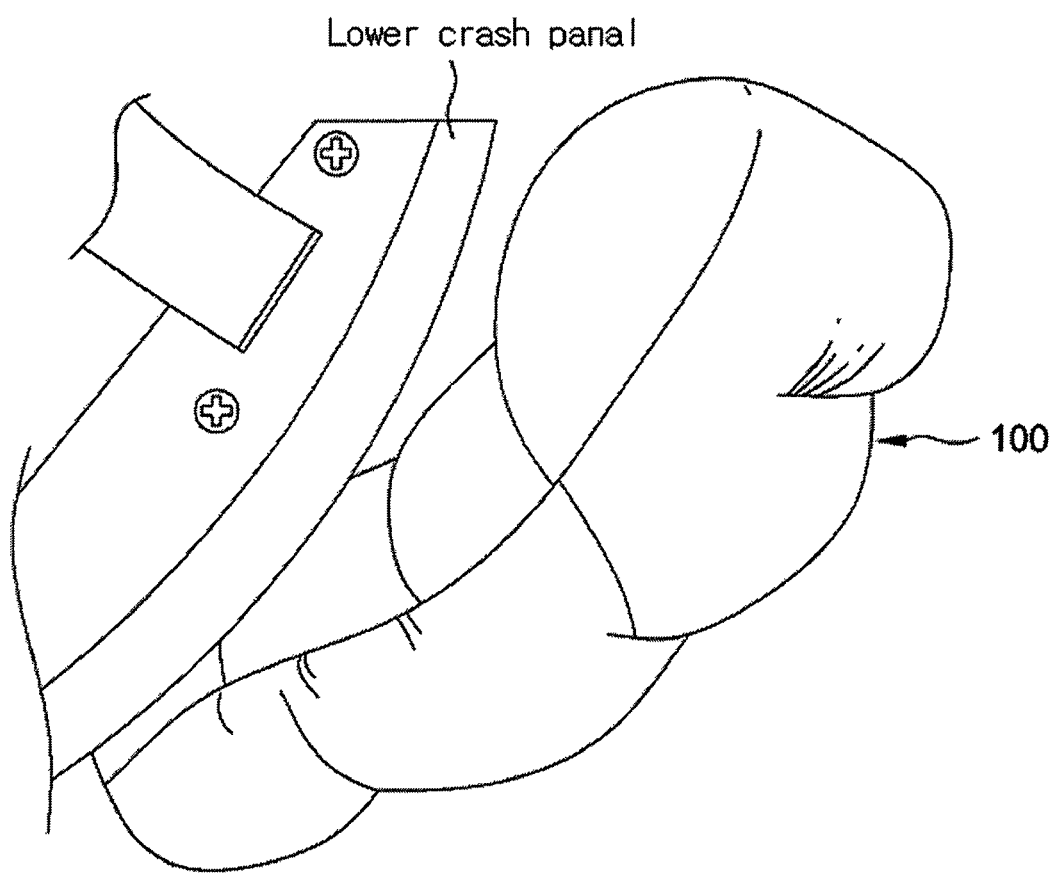
FIG. 4 is a perspective view of an expanded knee airbag in accordance with a first exemplary embodiment of the present invention.
Figure 5:
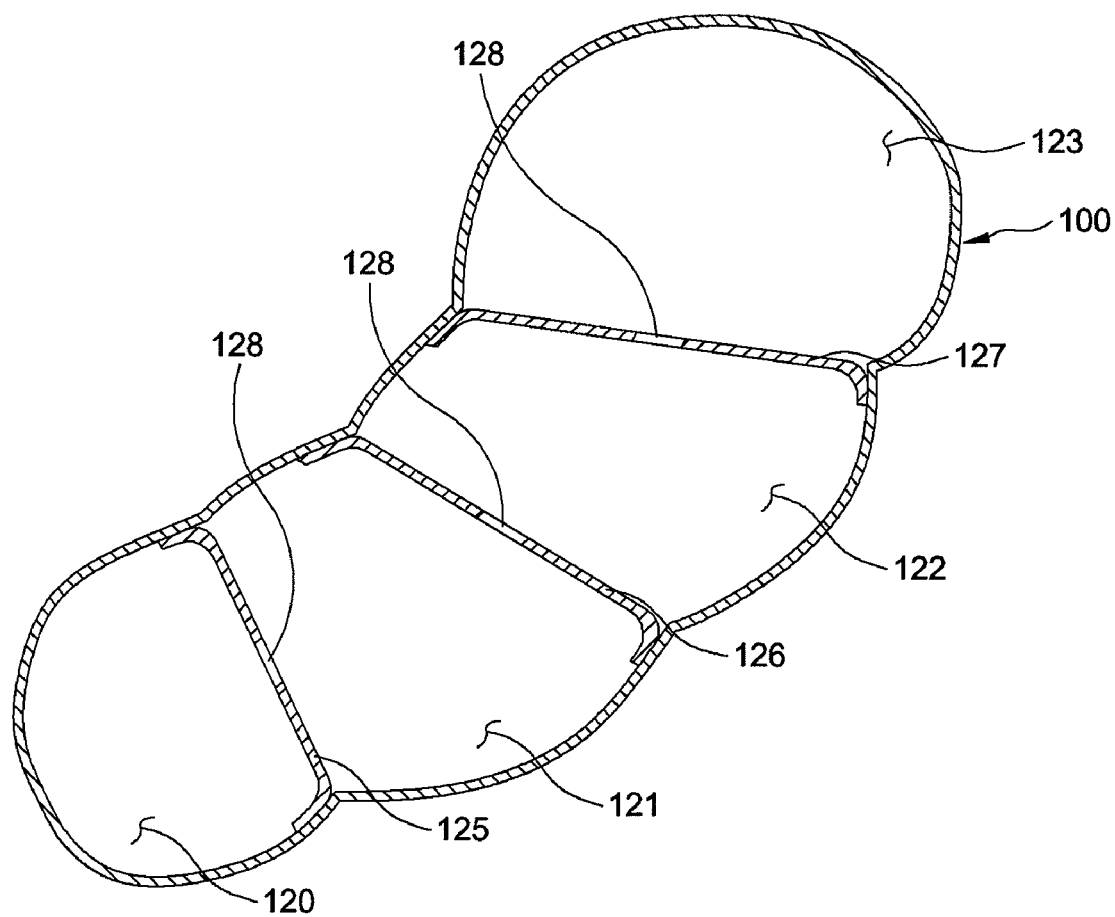
FIG. 5 is a cross-sectional view of FIG. 4.

FIG. 3 is a front view and a side view of a knee airbag in accordance with the present invention, FIG. 4 is a perspective view of an expanded knee airbag in accordance with the present invention, and FIG. 5 is a cross-sectional view of FIG. 4.

As shown in FIGS. 3 to 5, a knee airbag 100 in accordance with the present invention is installed in a lower crash panel (not shown) of a vehicle, and is spread in a substantially pentagonal shape.

The knee airbag 100 can be manufactured by cutting fabrics into the same shapes and sizes and sewing their peripheries, or cutting fabrics into symmetrical patterns and folding the fabrics based on a centerline thereof to sew the fabrics.

At this time, a wrinkle part 110 is formed at an upper part of the knee airbag 100. The wrinkle part 110 is formed by sewing a portion of the knee airbag 100 while the portion is partially folded.

In addition, at least one wrinkle part 110 may be formed at an upper part of the knee airbag 100. In particular, two or three wrinkle parts 110 may be formed to largely expand the knee airbag 100 upon expansion of the knee airbag 100.

Further, as shown in FIG. 5, a first tether 125, a second tether 126, and a third tether 127 are fixed in the knee airbag 100 to divide the knee airbag 100 into chambers 120, 121, 122 and 123. The tethers 125, 126 and 127 are fixed in different angles and lengths. For example, with reference to the second tether 126, the first tether 125 is fixed by an angle lower than that of the second tether 126, and the third tether 127 is fixed by an angle higher than that of the second tether 126.

Furthermore, the first tether 125 has a width smaller than that of the second tether 126, and the third tether 127 has a width larger than that of the second tether 126. The tethers 125, 126 and 127 have holes 128 through which an expansion gas passes.

Unlike this, the first tether 125 may be fixed by an angle lower than and may have a width larger than that of the second tether 126, and the third tether 127 may be fixed by an angle higher than and may have a width smaller than that of the second tether 126.

In addition, an installation hole 101 is formed in a lower part of the knee airbag 100 such that an inflator (not shown) is installed.

In the knee airbag 100 in accordance with the present invention constituted as described above, when a vehicle is side-collided, rolled over, or rapidly stopped, a collision sensor detects the collision and sends a collision signal to an electronic control unit.

Then, the electronic control unit determines expansion of the knee airbag 100 depending on an impact level input from the collision sensor. When the impact level is high, the electronic control unit sends a signal for expanding the knee airbag 100 to the inflator.

At this time, the inflator operates an ignition circuit installed in the inflator according to a control signal from the electronic control unit to perform electrical ignition, and explodes gunpowder therein through the electrical ignition to burn a gas generating agent using heat therefrom.

The expansion gas generated from the inflator is discharged through the installation hole 101. The discharged expansion gas is introduced into the first chamber 120 and then moved into the second chamber 121 through the hole 128 of the first tether 125.

The moved expansion gas expands the second chamber 121, and at the same time, is introduced into the third chamber 122 through the hole 128 of the second tether 126 and moved to the third tether 127.

Then, the expansion gas is moved into the fourth chamber 123 through the hole 128 of the third tether 127 to expand the fourth chamber 123.

As shown in FIG. 5, in the knee airbag 100 expanded as described above, since the first tether 125 is fixed by the smallest angle and has the smallest width, in comparison with the second tether 126 and the third tether 127, the first chamber 120 is expanded by the smallest size.

In addition, since the second chamber 121 is defined by the first tether 125 and the second tether 126, the second chamber 121 is expanded more than the first chamber 120. Further, since the third chamber 122 is defined by the second tether 126 and the third tether 127, the third chamber 122 is expanded more than the second chamber 121.

Furthermore, the fourth chamber 123 is expanded more than the first chamber 120 to the third chamber 122.

The chambers 120, 121, 122 and 123 are expanded on different size in a curved shape along the curved lower crash panel, and as a result that the size of the chambers 120, 121, 122 and 123 are increased from a downside to upside, the chambers protect not only passenger's knees but also passenger's ankles from impact.

In addition, at least one wrinkle part 110 is formed at the upper part of the knee airbag 100 such that the upper part is expanded by the introduced expansion gas more than a lower part thereof. That is, a periphery of the knee airbag 100 is limitedly expanded by a seamed part, while a center part of the knee airbag 100 is expanded toward the passenger more than the periphery.

Since the center part of the knee airbag in contact with the passenger's knees is expanded more than the periphery, it is possible to more safely protect the passenger.

Embodiment 2

Figure 6:
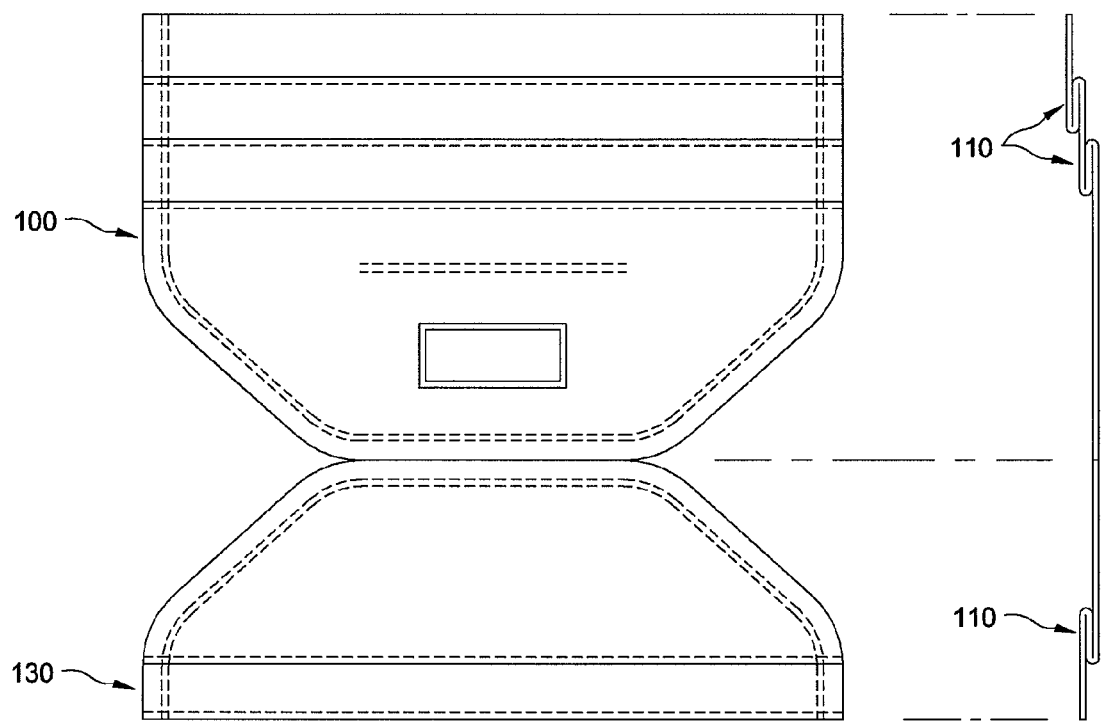
FIG. 6 is a front view and a side view of a knee airbag in accordance with a second exemplary embodiment of the present invention.
Figure 7:
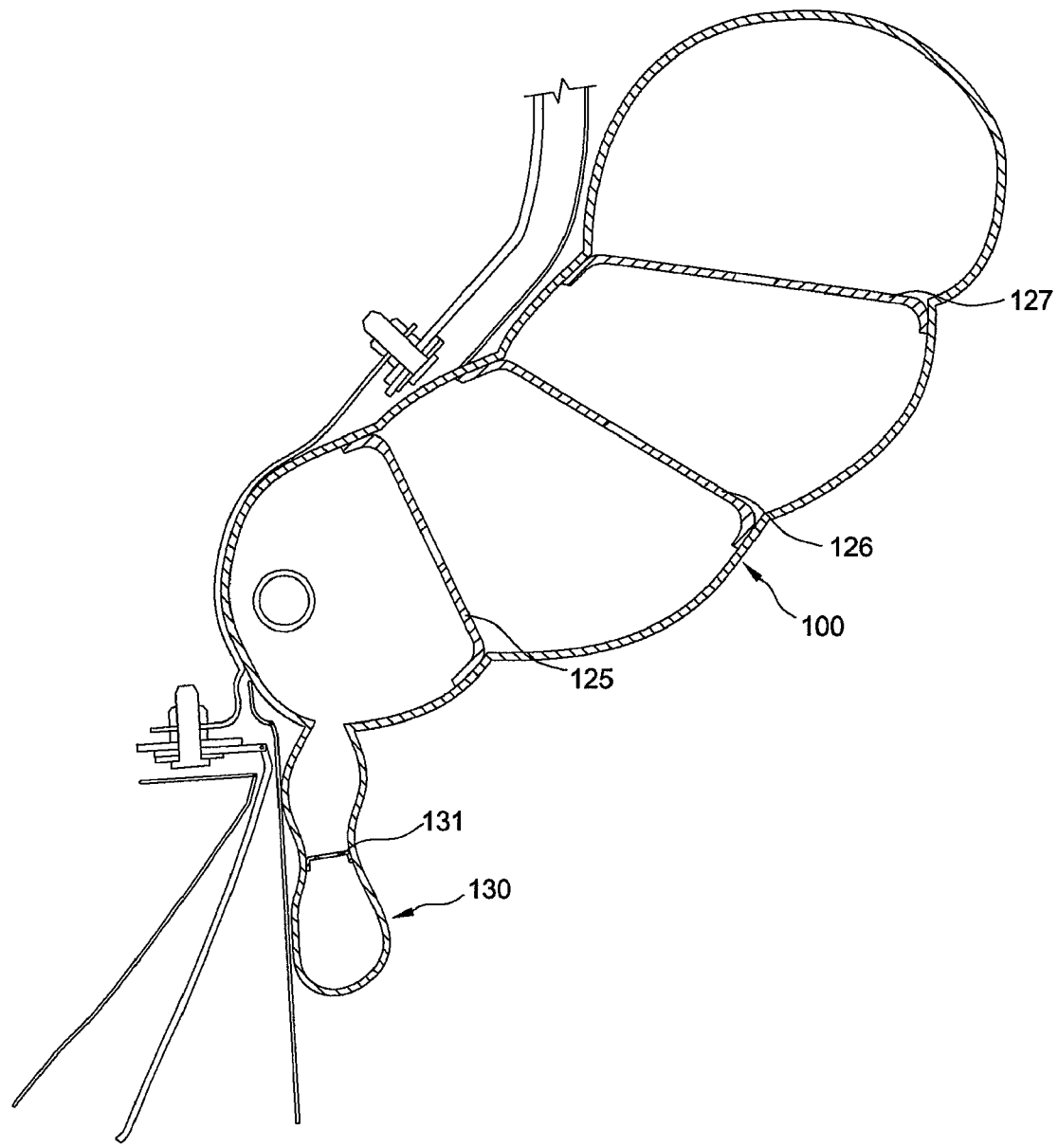
FIG. 7 is a cross-sectional view of FIG. 6.

Embodiment 2 is shown in FIGS. 6 and 7. Descriptions of the same parts as Embodiment 1 will not be repeated. Like reference numerals designate like components throughout Embodiment 2.

FIG. 6 is a front view and a side view of Embodiment 2 in accordance with the present invention, and FIG. 7 is a cross-sectional view of Embodiment 2 in accordance with the present invention.

As shown in FIGS. 6 and 7, a knee airbag of Embodiment 2 in accordance with the present invention further includes an extension airbag 130 extending downward from a lower part thereof.

Similar to Embodiment 1, the extension airbag 130 may have a wrinkle part 110 formed at its lower part, and may have at least one tether 131 fixed therein.

In addition, the tether 131 has a hole (not shown) through which an expansion gas passes. Of course, at least one tethers 131 may be fixed in different angles and lengths.

In the knee airbag 100 of the present invention constituted as described above, the expansion gas discharged from the inflator is moved upward to expand the knee airbag 100, and then divisionally moved downward to expand the extension airbag 130 at once.

While the knee airbag 100 having the extension airbag 130 is expanded by divisional supply of the expansion gas from the inflator, since expansion of the knee airbag 100 is similar to Embodiment 1, its description will not be repeated.

Embodiment 3

Figure 8:
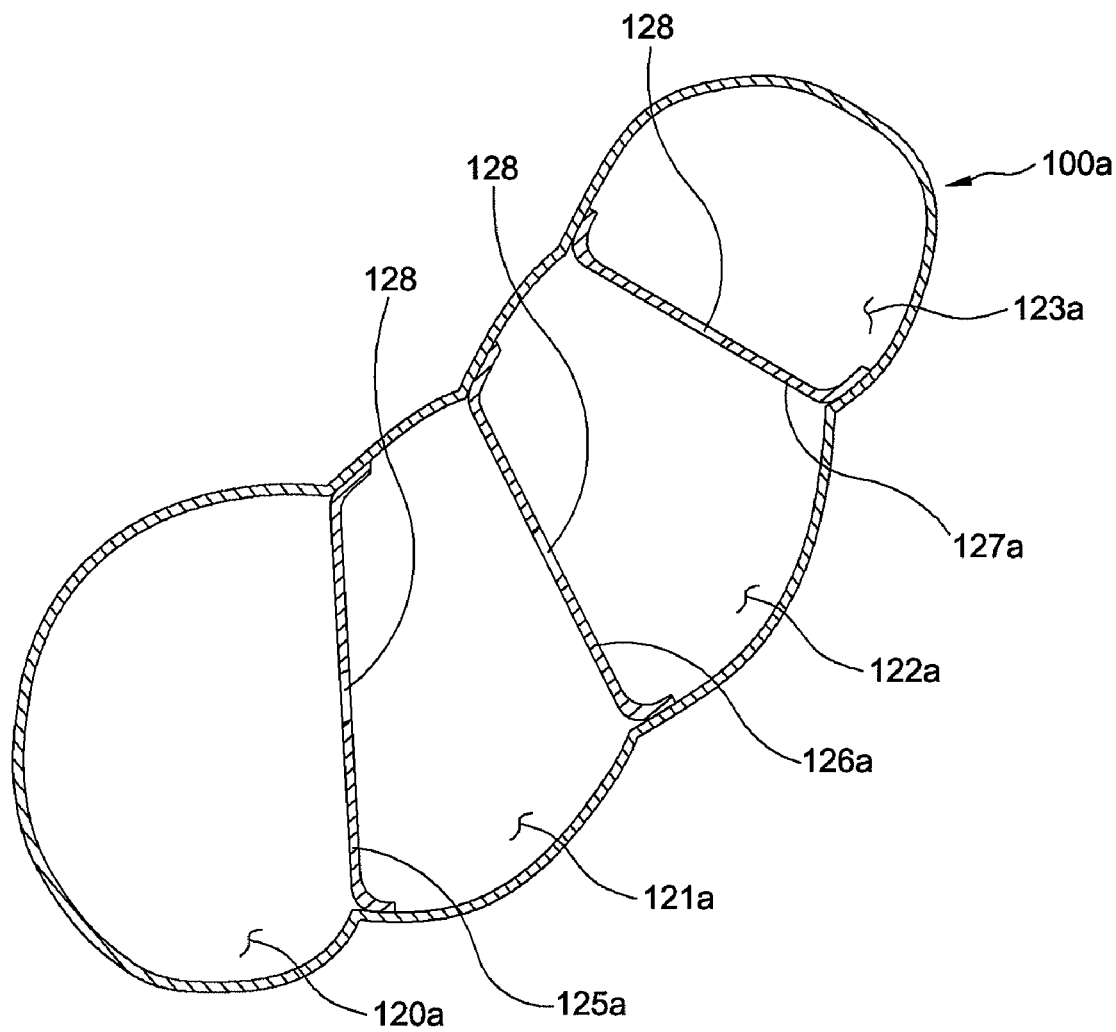
FIG. 8 is a cross-sectional view of a knee airbag in accordance with a third exemplary embodiment of the present invention.

FIG. 8 is a cross-sectional view of Embodiment 3 in accordance with the present invention.

As shown in FIG. 8, Embodiment 3 in accordance with the present invention may be applied to a knee airbag 100a having a shape that the knee airbag 100 of Embodiment 1 is turned upside down.

The knee airbag 100a includes a first chamber 120a, a second chamber 121a, a third chamber 122a, and a fourth chamber 123a. The first chamber 120a has the largest size, and the second chamber 121a, the third chamber 122a and the fourth chamber have sizes, which are sequentially reduced.

In addition, a first tether 125a, a second tether 126a, and a third tether 127a are formed between the chambers 120a, 121a, 122a and 123a, and have holes 128 through which an expansion gas passes.

Further, the first tether 125a is fixed by an angle lower than and may have a width larger than that of the second tether 126a, and the third tether 127a is fixed by an angle higher than and may have a width smaller than that of the second tether 126a.

Furthermore, the knee airbag 100a may also selectively have an extension airbag 130 similar to Embodiment 2.

Since the knee airbag in accordance with Embodiment 3 is similar to Embodiment 1, the same descriptions as Embodiments 1 and 2 will not be repeated. Different from Embodiment 1, the knee airbag 100a is expanded such that a lower part of the airbag 100a is wide and an upper part thereof is narrow.

The knee airbag 100a can more safely protect driver's ankles or passenger's ankles upon occurrence of accidents.

Embodiment 4

Figure 9:
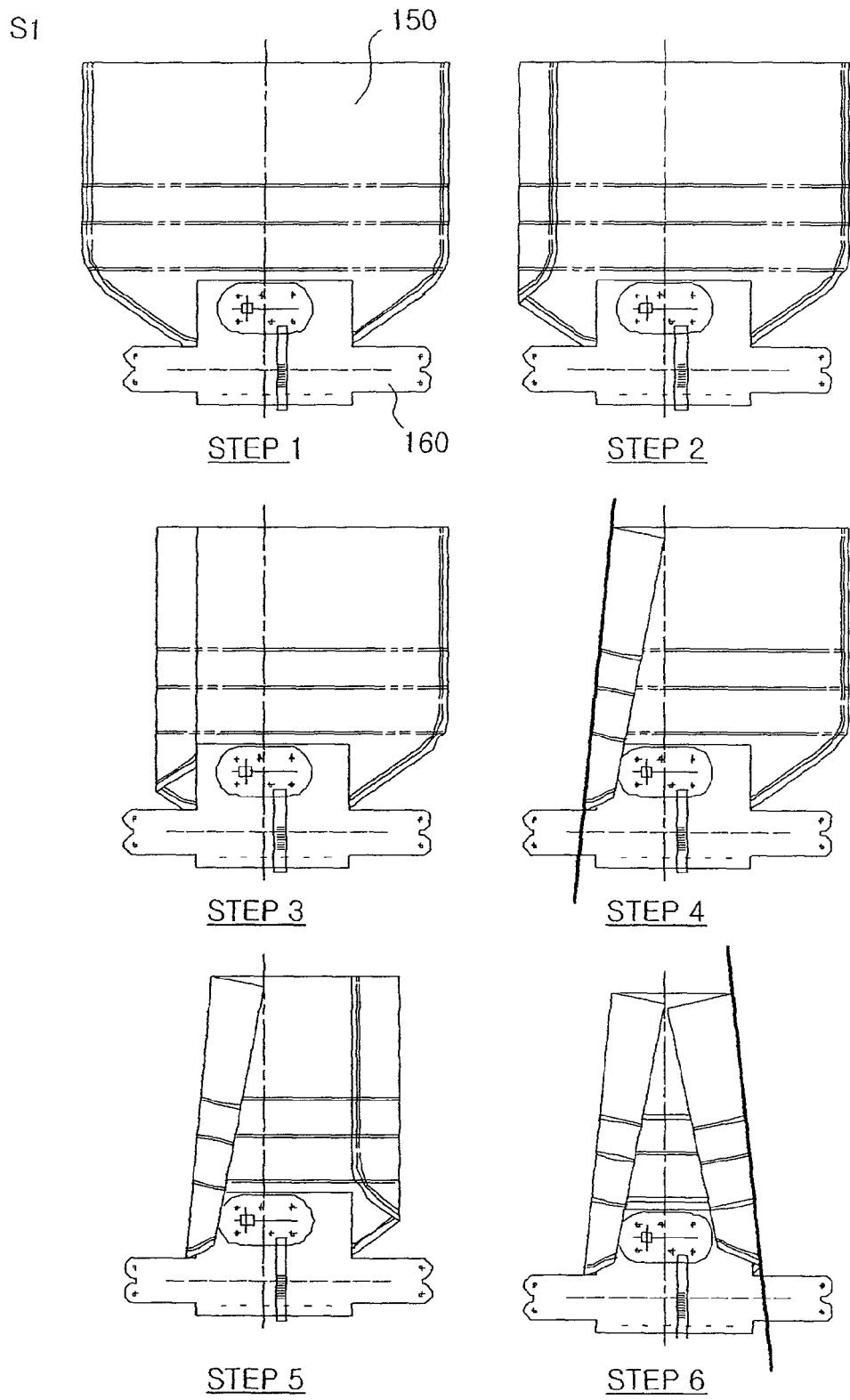
FIG. 9 is a view showing a side surface roll-folding step in accordance with a fourth exemplary embodiment of the present invention.

FIG. 9 is a view showing side surface roll-folding steps of Embodiment 4 in accordance with the present invention, FIG. 10 is a view showing vertical roll-folding steps of Embodiment 4 in accordance with the present invention, and FIG. 11 is a view showing finishing steps of Embodiment 4 in accordance with the present invention.

In addition, an airbag in accordance with the present invention will be described with respect to a knee airbag for protecting a passenger seated on a passenger seat, but may not be limited thereto.

The airbag of Embodiment 4 in accordance with the present invention is folded in a sequence shown in FIGS. 9 to 11.

A method of folding an airbag includes a side surface roll-folding step S1, a vertical roll-folding step S2, and a finishing step S3.

First, in the side surface roll-folding step S1, after locating a connection part 160 connected to an inflator (not shown) downside, one side of the airbag 150 is folded by a certain area. Then, after one more folding of the airbag 150 in an initial folding direction, the airbag 150 is folded to form an acute angle with respect to a centerline thereof.

Next, the other side of the airbag 150 is folded such that the initially folded width is larger than initial folding width of the one side. Then, the airbag is folded to form an acute angle with respect to the centerline such that the acute angle of the other side is smaller than that of the one side.

Next, in the vertical roll-folding step S2, the airbag 150 is folded from an upside toward the connection part 160. At this time, since the side surface roll-folding is performed to form certain angles, seamed parts of the airbag 150 do not overlap each other.

Further, in the finishing step S3, after completion of the vertical roll-folding, the airbag 150 is reversed and then folded in an opposite direction of the folded direction, and the connection part 160 is surrounded on the folded part.

Embodiment 5

Hereinafter, an airbag of Embodiment 5 in accordance with the present invention will be described.

Figure 12:
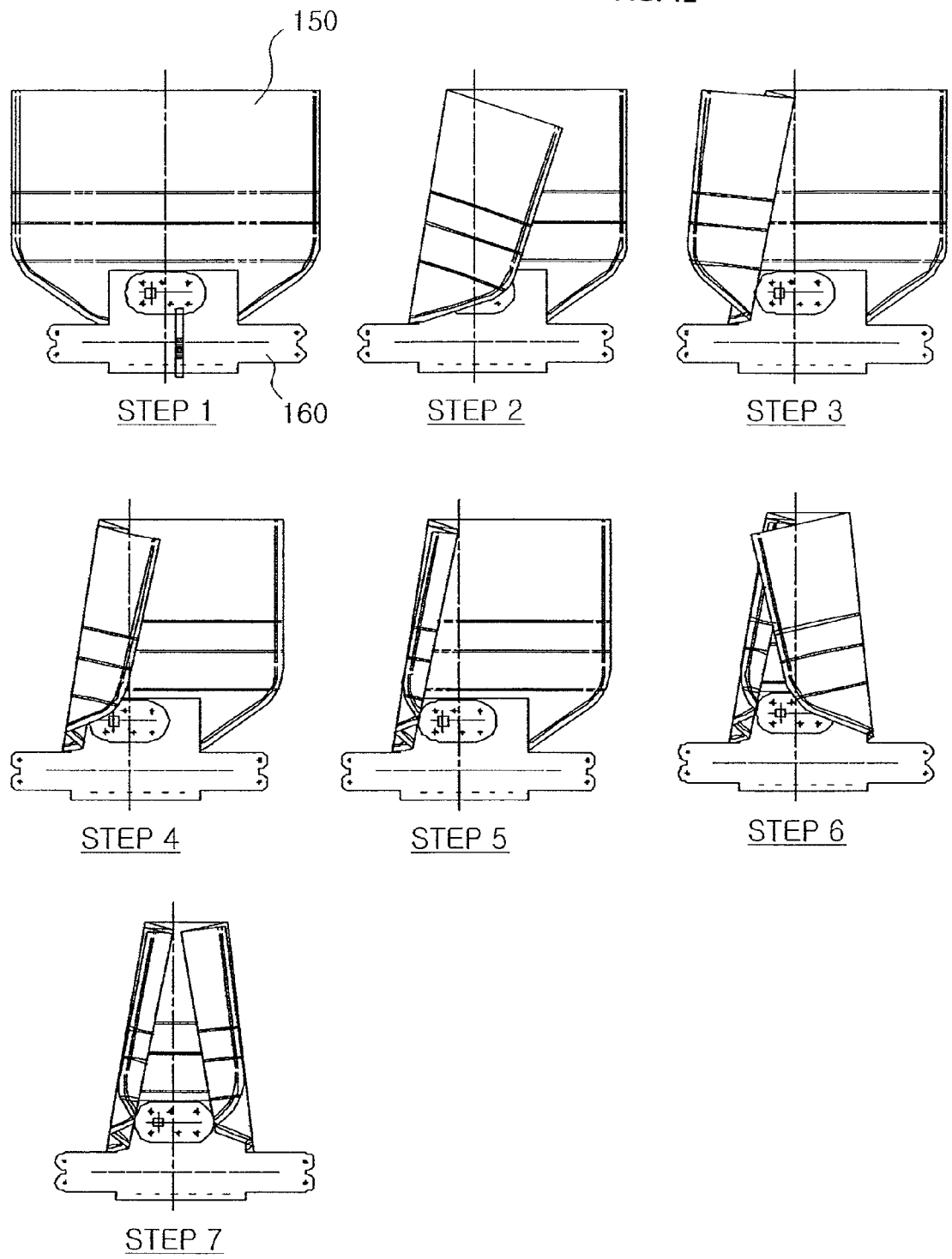
FIG. 12 is a view showing a side surface roll-folding step in accordance with a fifth exemplary embodiment of the present invention.
Figure 13:
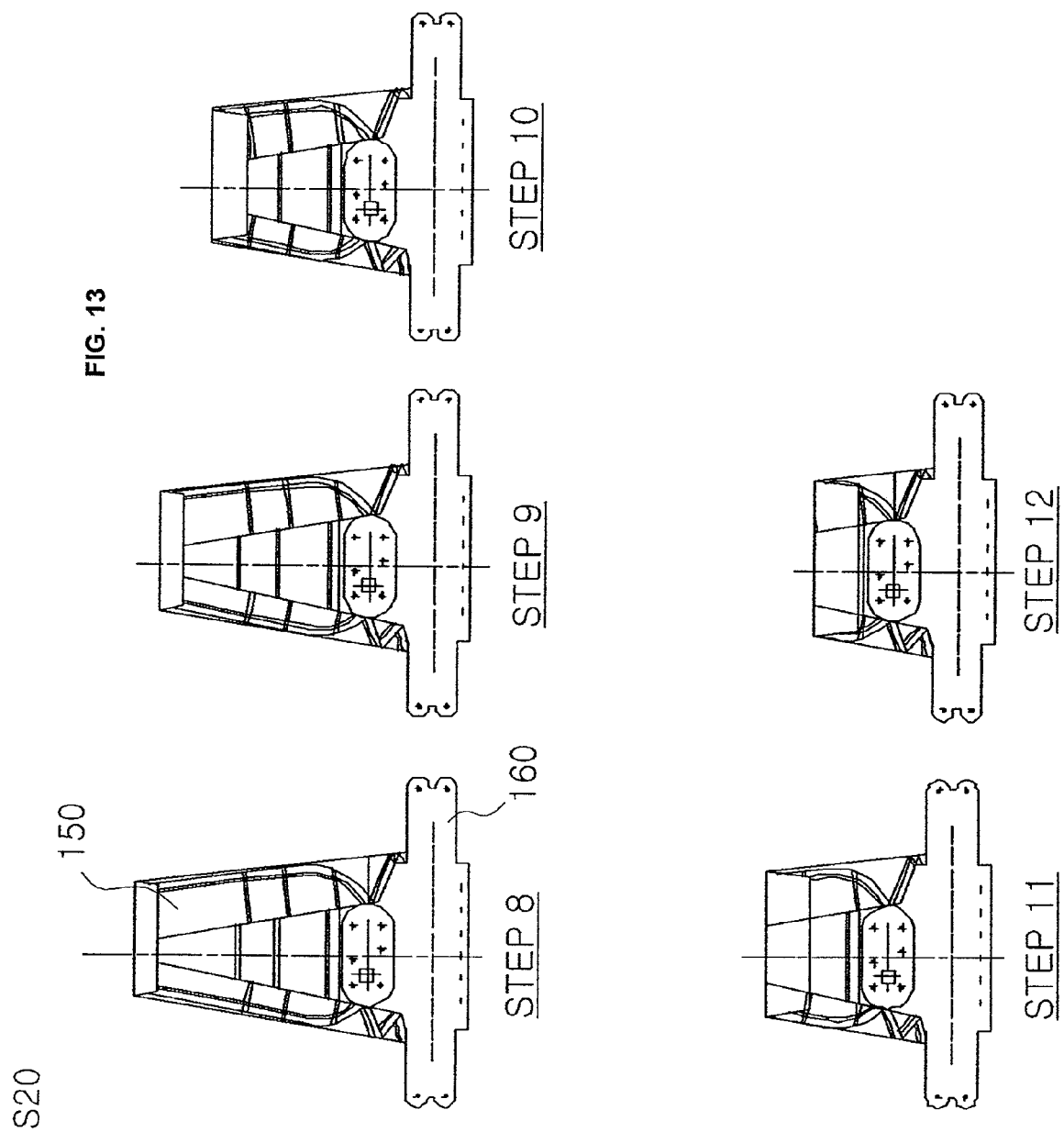
FIG. 13 is a view showing a vertical roll-folding step in accordance with a fifth exemplary embodiment of the present invention.

The airbag of Embodiment 5 is folded in a sequence shown in FIGS. 12 to 14. First, in a side surface roll-folding step S10, after locating a connection part 160 connected to an inflator (not shown) downward, one side of the airbag 150 is folded toward a centerline of the airbag 150. At this time, the folded line has an acute angle with respect to centerline thereof and an end of the folded one side goes over the centerline.

Then, the folded end of the one side is folded outward in an opposite direction such that a folded line does not go over the centerline. Then, the remaining part of the one side is sequentially and alternately folded correspond to the folded width.

Next, an end of the other side is folded toward the centerline. At this time, an angle of the other side is smaller than that of the one side, and a width of the other side is larger than that of the one side.

Next, in a vertical roll-folding step S20 as a second step, the airbag is folded toward the connection part. Since the side surface roll-folding is performed to form certain angles similar to Embodiment 4, seamed parts of the airbag 150 do not overlap each other.

In addition, in a finishing step S30 as a third step, similar to Embodiment 4, after completion of the vertical roll-folding, the airbag 150 is reversed and then folded in an opposite direction of the folded direction, and the connection part 160 is surrounded on the folded part As can be seen from the foregoing, since an upper part of a knee airbag in accordance with the present invention is expanded more than a lower part thereof, it is possible to more safely protect passenger's knees. In addition, since the knee airbag is expanded upward and downward, it is also possible to protect passenger's ankles and readily adjust the height and width of the knee airbag. Further, the knee airbag is expanded to correspond to an appearance of a lower crash, thereby more safely protecting the passenger.

Furthermore, the airbag in accordance with the present invention is prevented from collision with an instrument panel to enable sequential and rapid deployment.

In addition, because a side surface roll-folding step is performed to form a certain inclination, it is possible to prevent seamed parts from being bulged due to overlapping of the seamed parts after folding the airbag.

Therefore, the airbag in accordance with the present invention is installed at a lower crash panel in front of a driver's seat and a passenger's seat to protect the driver and passenger's ankles as well as the driver and passenger's knees.

While this invention has been described with reference to exemplary embodiments thereof, it will be clear to those of ordinary skill in the art to which the invention pertains that various modifications may be made to the described embodiments without departing from the spirit and scope of the invention as defined in the appended claims and their equivalents.

What is claimed is:

1. A knee airbag installed at a lower crash panel and having an inflator installed at a predetermined position thereof, the knee airbag comprising a front panel facing an occupant and a rear panel facing the front panel, the front panel having at least one wrinkle part folded in an upper portion thereof in a vertical direction to have an airbag deployment shape in which an upper part of the airbag is expanded more than a lower part of the airbag, the knee airbag further comprising a plurality of tethers connected inside the front and rear panels in different lengths, wherein the plurality of tethers includes a first tether, a second tether, and a third tether, and wherein the first tether has a smaller width than that of the second tether, and the third tether has a larger width than that of the second tether, and angles between the rear panel and each tether are different from each other when the airbag is deployed, and wherein the first tether has a smaller angle relative to the rear panel than that of the second tether and the third tether has a larger angle relative to the rear panel than that of the second tether.

2. The knee airbag according to claim 1, wherein the plurality of tethers have holes through which an expansion gas is to pass.

3. The knee airbag according to claim 1, further comprising an extension airbag extending downward from the knee airbag.

4. The knee airbag according to claim 2, further comprising an extension airbag extending downward from the knee airbag.

5. The knee airbag according to claim 3, wherein the extension airbag selectively has at least one wrinkle part folding to overlap each other.

6. The knee airbag according to claim 3, wherein the knee airbag is configured to expand to correspond to a lower crash panel fixed to a vehicle in a curved manner.

7. The knee airbag according to claim 3, wherein the extension airbag comprises at least one tether having holes through which an expansion gas is to pass, the at least one tether being fixed in the extension airbag.

8. The knee airbag according to claim 4, wherein the extension airbag selectively has at least one wrinkle part folding to overlap each other.

9. The knee airbag according to claim 4, wherein the knee airbag is configured to expand to correspond to a lower crash panel fixed to a vehicle in a curved manner.

10. The knee airbag according to claim 4, wherein the extension airbag comprises at least one tether having holes through which an expansion gas is to pass, the at least one tether being fixed in the extension airbag.

* * * * *